US012670032B2

(12) United States Patent
Deitch

(10) Patent No.: US 12,670,032 B2
(45) Date of Patent: Jun. 30, 2026

(54) SMOOTHING TERMINATION OF CLOUD RESOURCES

(71) Applicant: YellowDog Limited, Bristol (GB)

(72) Inventor: Benjamin Neil Deitch, Bristol (GB)

(73) Assignee: Yellowdog Ltd, Bristol (GB)

( * ) Notice: Subject to any disclaimer, the term of this patent is extended or adjusted under 35 U.S.C. 154(b) by 427 days.

(21) Appl. No.: 18/537,774

(22) Filed: Dec. 12, 2023

(65) Prior Publication Data

US 2024/0192998 A1 Jun. 13, 2024

(30) Foreign Application Priority Data

Dec. 13, 2022 (GB) ...................................... 2218774

(51) Int. Cl.
G06F 9/50 (2006.01)

(52) U.S. Cl.
CPC ............ G06F 9/505 (2013.01); G06F 9/5072 (2013.01); *G06F 2209/5019* (2013.01)

(58) Field of Classification Search
None
See application file for complete search history.

(56) References Cited

U.S. PATENT DOCUMENTS

| | | | | |
|---|---|---|---|---|
| 8,261,278 | B2 * | 9/2012 | Peracha | G06F 11/3409 |
| | | | | 718/1 |
| 11,003,491 | B1 * | 5/2021 | Gasser | G06N 3/0464 |
| 11,294,733 | B2 * | 4/2022 | Chester | G06F 9/5083 |
| 11,309,061 | B1 * | 4/2022 | Haseeb | G16B 40/10 |
| 11,972,301 | B2 * | 4/2024 | Yang | G06F 9/4881 |
| 12,327,199 | B2 * | 6/2025 | Jagota | G06N 20/00 |
| 2006/0242648 | A1 * | 10/2006 | Guccione | G06F 9/5038 |
| | | | | 718/105 |

(Continued)

FOREIGN PATENT DOCUMENTS

| | | | |
|---|---|---|---|
| CN | 114721798 | 7/2022 | |
| WO | WO-2015153242 A1 * | 10/2015 | ........... G06F 9/5072 |

(Continued)

OTHER PUBLICATIONS

Swain, Chinmaya Kumar et al. "Interference Aware Workload Scheduling for Latency Sensitive Tasks in Cloud Environment." Springer Nature, pp. 925-950. (Year: 2021).*

(Continued)

*Primary Examiner* — Lewis A Bullock, Jr.
(74) *Attorney, Agent, or Firm* — Alley IP

(57) ABSTRACT

When tasks require compute/storage resources for their execution, provide these resources in a cloud, so the tasks can be executed on cloud resources. When one or more tasks are added, additional cloud resources are required to accommodate this increased workload. Initiating new cloud resources introduces latency into the process. Exponential smoothing may slow the rate at which unused cloud resources are terminated; however, this is processor intensive. With present invention it is not necessary to track the history of multiple data points from each time interval. Rather, it is only necessary to keep record of the number of tasks that were added to the workload during the first time interval. The controller only needs to keep a record of time intervals in which new tasks are added to the workload. In the intervening intervals, in which no new tasks were added, a simplified version of exponential smoothing can be applied.

8 Claims, 2 Drawing Sheets

(56)  References Cited

U.S. PATENT DOCUMENTS

| | | | |
|---|---|---|---|
| 2011/0270795 A1* | 11/2011 | Smith | G06F 11/3442 |
| | | | 709/224 |
| 2015/0074679 A1* | 3/2015 | Fenoglio | H04L 67/1008 |
| | | | 718/104 |
| 2016/0019094 A1 | 1/2016 | Habdank et al. | |
| 2017/0185456 A1 | 6/2017 | Bramary et al. | |
| 2019/0073234 A1 | 3/2019 | Wagner et al. | |
| 2019/0087228 A1* | 3/2019 | Ross | G06F 9/5005 |
| 2019/0213027 A1* | 7/2019 | Bhandari | G06F 9/505 |
| 2019/0243686 A1* | 8/2019 | LaBute | G06F 9/5027 |
| 2020/0285503 A1* | 9/2020 | Dou | G06F 9/5072 |
| 2023/0136226 A1* | 5/2023 | Mo | G06F 9/505 |
| | | | 718/104 |
| 2023/0214308 A1* | 7/2023 | Chen | G06F 9/505 |
| | | | 718/104 |
| 2024/0069998 A1* | 2/2024 | Chatterjee | G06F 9/5027 |
| 2024/0303134 A1* | 9/2024 | White | G06F 9/5083 |
| 2024/0338254 A1* | 10/2024 | Muttikal Thomas | |
| | | | G06F 9/45558 |
| 2024/0370306 A1* | 11/2024 | Hopper | G06F 9/5077 |

FOREIGN PATENT DOCUMENTS

| | | | | | |
|---|---|---|---|---|---|
| WO | WO-2018109407 A1 * | 6/2018 | | | G06F 9/505 |
| WO | WO-2019152229 A2 * | 8/2019 | | | G06F 9/5005 |

OTHER PUBLICATIONS

Mehta, Amardeep et al. "Online Spike Detection in Cloud Workloads." IEEE, pp. 446-451 (Year: 2015).*

Lorido-Botran, Tania et al. "Auto-Scaling Techniques for Elastic Applications in Cloud Environments". Department of Computer Architecture and Technology, University of the Basque Country. (Year: 2012).*

Aslanpour, Mohammad Sadegh et al. "SLA-Aware Resource Allocation for Application Service Providers in the Cloud" Second International Conference on Web Research. (Year: 2016).*

UKIPO, Search Report in corresponding GB application GB2218774. 4, May 23, 2023.

EPO, Extended European Search Report in corresponding EP application 23211010.6, Mar. 22, 2024.

* cited by examiner

SMOOTHING TERMINATION OF CLOUD RESOURCES

RELATED APPLICATIONS

This application claims benefit under 35 U.S.C. § 119 of GB Application 2218774.4, filed Dec. 13, 2022. This GB application is incorporated by reference herein in its entirety.

FIELD

The present invention relates generally to a controller configured to smooth termination of cloud resources and a method of smoothing termination of cloud resources and finds particular, although not exclusive, utility in providing cloud compute resources.

BACKGROUND

It is known to providing resources (e.g. compute resources, but potentially also storage resources, etc.) in a cloud. It is also known to schedule workloads (e.g. tasks) on those cloud resources.

When one or more tasks require compute/storage resources for their execution, it is well established to provide these resources in a cloud, such that the tasks can be executed on those cloud resources.

Typically, when one or more tasks are added to a workload, additional cloud resources are required to be initiated to accommodate this increased workload. Initiating a new cloud resource introduces latency into the process, adding pressure to the existing workload, and so it is desirable to have such additional cloud resources initiated in advance of new tasks being added to a workload.

However, keeping unused cloud resources running and unused is wasteful, and therefore it is also desirable to terminate any unused cloud resources as soon as possible after the tasks they are executing have completed. It is apparent that there is a balance to be struck between terminating unused cloud resources immediately in order to save power and cost, and maintaining these unused cloud resources to reduce latency when new tasks are added.

Machine learning may be used to predict the likely addition of tasks to a workload so that such tasks may be executed with a minimum of latency, while simultaneously reducing waste of unused resources. In effect, the system will prevent the termination of cloud resources if it expects additional tasks to be added to the workload imminently.

One approach would be to use exponential smoothing to slow the rate at which unused cloud resources are terminated. Specifically, a controller may be used to monitor the quantity of unused cloud resources on a regular schedule, for example every thirty seconds (i.e. upon expiry of some predefined time interval).

If no exponential smoothing is used, the controller would terminate all unused cloud resources upon expiry of the predefined time interval. The controller would then re-check the quantity of unused cloud resources each time the predefined time interval expires and terminate all unused cloud resources each time.

However, exponential smoothing is used to predict the number of tasks that are expected to be added to the workload during each predefined time interval, as follows:

A controller configured to smooth the termination of cloud resources by:

determining a number of tasks ($A_{t-1}$) that were added to a workload during a first time interval (t-1);

identifying a first quantity of cloud resources unused by the end of the first time interval (t-1);

estimating a second quantity, being a subset of the first quantity, of cloud resources to be required in a second time interval (t), the second time interval (t) immediately following the first time interval (t-1); and terminating a third quantity of unused cloud resources in the second time interval (t), the third quantity of unused cloud resources equal to the first quantity of cloud resources less the second quantity of cloud resources;

wherein the second quantity of cloud resources to be required in the second time interval is estimated from a number of tasks expected to be added to a workload ($F_t$) during the second time interval (t), the number of tasks expected to be added to the workload ($F_t$) during the second time interval (t) being estimated from the equation $$F_t = F_{t-1} + \alpha(A_{t-1} - F_{t-1})$$

where:

$F_{t-1}$ is a number of tasks that were expected to be added to the workload during the first time interval, t-1; and $\alpha$ is a smoothing factor having a value between zero and one.

The value of Ft-1 in the above expression may be determined by a similar approach taken with respect to the first time period (t-1) and an earlier time period (t-2), and the corresponding value of Ft-2 may be determined by a similar approach taken with respect to the earlier time period (t-1) and a still earlier time period (t-3), etc. A starting value for F (F0), before which no previous estimations were made may be any typical value, but may typically be chosen as zero, or an average of previously acquired data, or a user-input number based on experience.

$\alpha$ may have a value between zero and one. $\alpha$ having a value of zero is equivalent to a constant forecast (i.e. no machine learning); that is, Ft would be assumed to be equal to F0 for all values of t. $\alpha$ having a value of one is equivalent to no smoothing per se, but instead a delay in the termination of unused cloud resources of just one predefined time interval. Circumstances may determine what value of a may be chosen; however, a value of between 0.2 and 0.8 is preferred, in particular between 0.3 and 0.7, more particularly between 0.4 and 0.6, for example approximately 0.5.

However, this method is processor intensive, as it requires a controller to continually operate to monitor the quantity of unused cloud resources upon expiry of every predefined time interval; that is, if one time interval is missed that will affect the calculation of the prediction for all subsequent time periods.

SUMMARY

According to a first aspect of the present invention there is provided a controller configured to smooth termination of cloud resources, the controller configured to:

determine a number of tasks ($A_{t-n}$) that were added to a workload during a first time interval (t-n);

identify a first quantity of cloud resources unused by the end of the first time interval (t-n);

estimate a second quantity, being a subset of the first quantity, of cloud resources to be required in a second time interval (t); and terminate a third quantity of unused cloud resources in the second time interval (t), the third quantity of unused cloud resources equal to the first quantity of cloud resources less the second quantity of cloud resources;

wherein the second quantity of cloud resources to be required in the second time interval (t) is estimated from a number of tasks expected to be added to a workload ($F_t$) during the second time interval (t), the number of tasks expected to be added to the workload ($F_t$) during the second time interval (t) being estimated from the equation $$F_t = (1-\alpha)^{n-1}(F_{t-n} + \alpha(A_{t-n} - F_{t-n}))$$

where:

$F_{t-n}$ is a number of tasks that were expected to be added to the workload during the first time interval (t-n);

n is the number of time intervals from the first time interval (t-n) to the second time interval (t); and α is a smoothing factor having a value between zero and one.

In this way, a more efficient way of balancing (a) the act of terminating unused cloud resources immediately in order to save power and cost, with (b) the act of maintaining these unused cloud resources to reduce latency when new tasks are added, is achieved.

Specifically, it is not necessary to track the history of multiple data points from each time interval. Rather, it is only necessary to keep a record of the number of tasks that were added to the workload during the first time interval; that is, the controller only needs to keep a record of time intervals in which new tasks are added to the workload. This is because, in the intervening intervals, in which no new tasks were added, a simplified version of exponential smoothing can be applied.

The controller may comprise a computer processor, microprocessor or other form of automated controller, and may itself be cloud resource, association of processors, etc.

In the context of this application, smoothing the termination of cloud resources means limiting the number of unused cloud resources that are terminated in a given time period, potentially deferring their termination until a later time period if still not required.

Determining a number of tasks that were added to a workload during a given time interval may be performed as part of a greater tracking process in which, for instance, each task may be tracked (e.g. by the controller) by identifying when a task starts, completes and/or the level of performance of that task (e.g. whether the task has been interrupted, whether the task is running more slowly than expected, etc.).

Identifying a quantity of cloud resources unused by the end of a given time interval may be performed as part of a wider monitoring process in which, for instance, each cloud resource may be monitored (e.g. by the controller) by confirming it is functional, measuring its performance, and/or establishing availability.

When required, the controller is configured to furnish additional resources, replace low-performing resources and/or cancel unused resources, in real time and without interruption.

Estimating a quantity of cloud resources to be required in a given time interval may comprise establishing a number of tasks that each cloud resource can accommodate (e.g. from a log or look-up table).

Terminating unused cloud resources may comprise spinning down such a resource.

Each time interval may be the same length as each other time interval; however, in some embodiments, the time intervals may be of differing lengths.

The number of tasks (At-n) will be a whole number. However, the equation may result in a value for Ft that is not a whole number. Accordingly, the number of tasks expected to be added to a workload may be the integer part of Ft (any may be rounded up or down). Accordingly, the value of Ft-n to use in the equation (calculated during previous iterations) may not be a whole number.

Alternatively, the equation may be approximated such that Ft may be a whole number; specifically, Ft may be the integer part of the right-hand side of the equation recited above, and may be rounded up or down. Accordingly, the value of Ft-n to use in the equation (calculated during previous iterations) would likewise be an integer whole number.

A starting value for F (F0), before which no previous estimations were made may be any typical value, but may typically be chosen as zero, or an average of previously acquired data, or a user-input number based on experience.

α may have a value between zero and one. α having a value of zero is equivalent to a constant forecast (i.e. no machine learning); that is, Ft would be assumed to be equal to F0 for all values of t. α having a value of one is equivalent to no smoothing; i.e. Ft would be zero for all values of t. Circumstances may determine what value of a may be chosen; however, a value of between 0.2 and 0.8 is preferred, in particular between 0.3 and 0.7, more particularly between 0.4 and 0.6, for example approximately 0.5.

The controller may be further configured to:

determine whether a further number of tasks has been added to the workload since the first time interval (t-n);

in response to determining that no further tasks have been added to the workload since the first time interval (t-n), estimate the second quantity of cloud resources to be required in the second time interval as recited in claim 1; and in response to determining that a second number ($A_{t-m}$) of tasks has been added to the workload since the first time interval (t-n):

identify a fourth quantity of cloud resources unused by the end of an intermediate time interval (t-m), the intermediate time interval (t-m) being the time interval in which the second number of tasks ($A_{t-m}$) was added to the workload; and estimate the second quantity of cloud resources to be required in the second time interval from the number of tasks expected to be added to a workload ($F_t$) during the second time interval (t), the number of tasks expected to be added to the workload ($F_t$) during the second time interval (t) being estimated from the equation $$F_t = (1-\alpha)^{m-1}(F_{t-m} + \alpha(A_{t-m} - F_{t-m}))$$

where:

$F_{t-m}$ is a number of tasks that were expected to be added to the workload during the intermediate time interval (t-m);

m is the number of time intervals from the intermediate time interval (t-m) to the second time interval (t).

According to a second aspect of the present invention, there is provided a method of smoothing termination of cloud resources, the method comprising the steps of:

determining a number of tasks ($A_{t-n}$) that were added to a workload during a first time interval (t-n);

identifying a first quantity of cloud resources unused by the end of the first time interval (t-n);

estimating a second quantity, being a subset of the first quantity, of cloud resources to be required in a second time interval (t); and terminating a third quantity of unused cloud resources in the second time interval (t), the third quantity of unused cloud resources equal to the first quantity of cloud resources less the second quantity of cloud resources; wherein estimating the second quantity of cloud resources to be required in the second time interval (t) comprises estimating from a number of tasks expected to be added to a workload ($F_t$) during the second time interval (t), the number of tasks expected to be added to the workload ($F_t$) during the second time interval (t) being estimated from the equation $$F_t = (1-\alpha)^{n-1}(F_{t-n} + \alpha(A_{t-n} - F_{t-n}))$$

where:

$F_{t-n}$ is a number of tasks that were expected to be added to the workload during the first time interval (t-n);

n is the number of time intervals from the first time interval (t-n) to the second time interval (t); and α is a smoothing factor having a value between zero and one.

According to a third aspect of the present invention, there is provided a non-transitory computer-readable medium storing instructions for carrying out the method of the second aspect.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
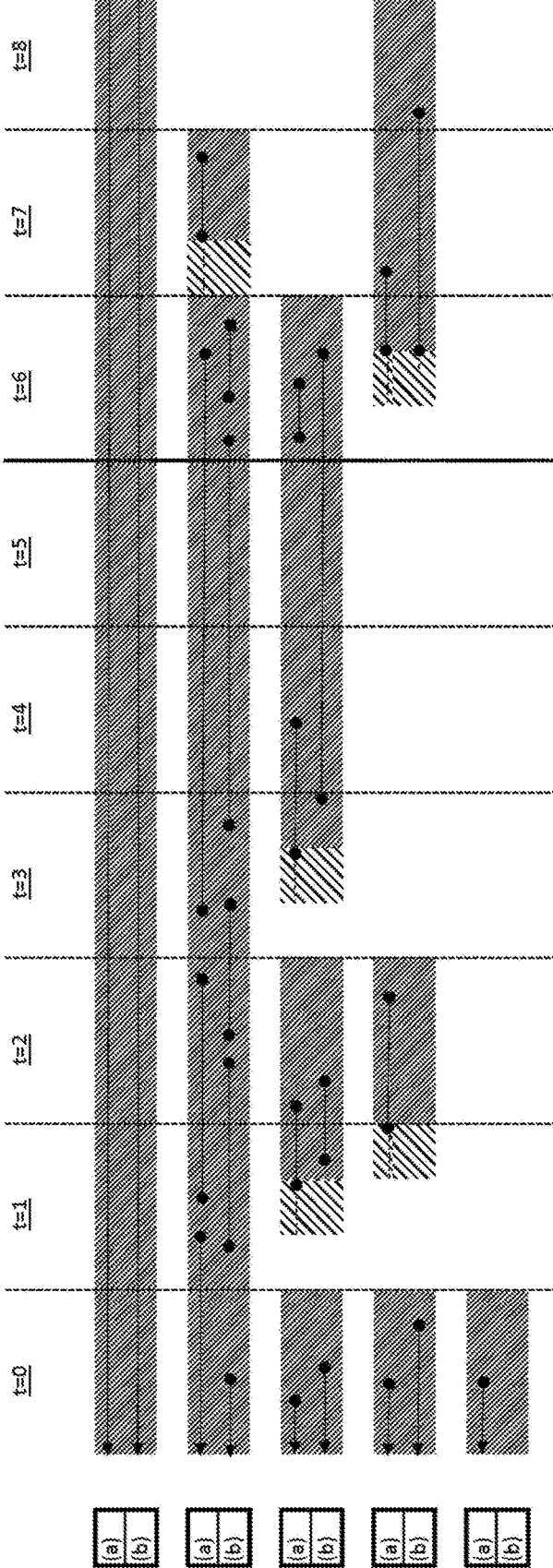
FIG. 1 shows a first arrangement of tasks running on cloud resources.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 shows a prior art arrangement having tasks running on cloud resources in which any unused cloud resources are terminated at the end of each time period.

Five respective cloud compute resources (referenced 1-5) are shown. For simplicity, each cloud computer resource (1-5) is capable of running two tasks in parallel labelled (a) and (b), respectively. Tasks themselves are shown as solid black lines extending through nine time intervals from t=0 to t=8. The line corresponding to each task being carried out on a respective cloud compute resource (1-5) starts and ends with a black circle; with the exception of tasks that were started prior to interval t=0 (indicated as a left-pointing arrow head) and tasks that continue beyond interval t=8 (indicated as a right-pointing arrow head).

Cloud compute resources (1-5) that are operational at any given time are shown in close diagonal hatching. Such cloud compute resources are available to run tasks thereon. Cloud compute resources (1-5) that are not operational at any given time are shown without any hatching, and are unavailable to run tasks thereon immediately.

If a task needs to be run, but there are insufficient available cloud compute resource (1-5), a new cloud computer resource (1-5) needs to be spun-up (indicated by broad diagonal hatching) before the task can be run thereon. Spinning up therefore causes a delay to the running of those tasks.

Instead of terminating a cloud compute resource as soon as no tasks are running on it, such resources are not terminated until the end of each time period, thereby allowing new tasks to be run on an available cloud compute resource without needing to spin-up a new cloud compute resource.

As shown in the figure, the first cloud compute resource 1 has two tasks running on it that begin before t=0 and continue beyond t=8. Accordingly, the first cloud compute resource is available over all nine time intervals, and beyond.

The second cloud compute resource 2 has two series of tasks run in parallel over time intervals t=0 to t=6, with at least one task of the two series spanning the boundary between each of these time intervals. However, as neither series of tasks has a task being run at the end of time interval t=6, the second cloud compute resource 2 is terminated.

However, as a new task is immediately required upon the commencement of time interval t=7, the second cloud compute resource is immediately spun-up to allow the new task to be run during time interval t=7. The second cloud compute resource 2 is again terminated at the end of time interval t=7.

The third cloud compute resource 3 is terminated at the end of time interval t=0 as it is not running any tasks. However, it is spun up again in time interval t=1 in order to run a new task, and then another one, both of which continue into time interval t=2, but not beyond. Accordingly, the third cloud compute resource is terminated at the end of time interval t=2. However, it is again spun up in time interval t=3 in order to run a further new task, and then another one, both of which continue into time interval t=4, the latter continuing through time interval t=5 and into time interval t=6, but not beyond. Accordingly, the third cloud compute resource is terminated at the end of time interval t=6.

The fourth cloud compute resource 4 is terminated at the end of time interval t=0 as it is not running any tasks. However, it is spun up again in time interval t=1 in order to run a new task which continue into time interval t=2, but not beyond. Accordingly, the fourth cloud compute resource is terminated at the end of time interval t=2. However, it is again spun up in time interval t=6 in order to run a further new task, and then another one, both of which continue into time interval t=7, the latter continuing through time interval t=7 and into time interval t=8, but not beyond. Accordingly, the fourth cloud compute resource 4 is terminated at the end of time interval t=8.

The fifth cloud compute resource 5 is terminated at the end of time interval t=0 as it is not running any tasks.

Figure 2:
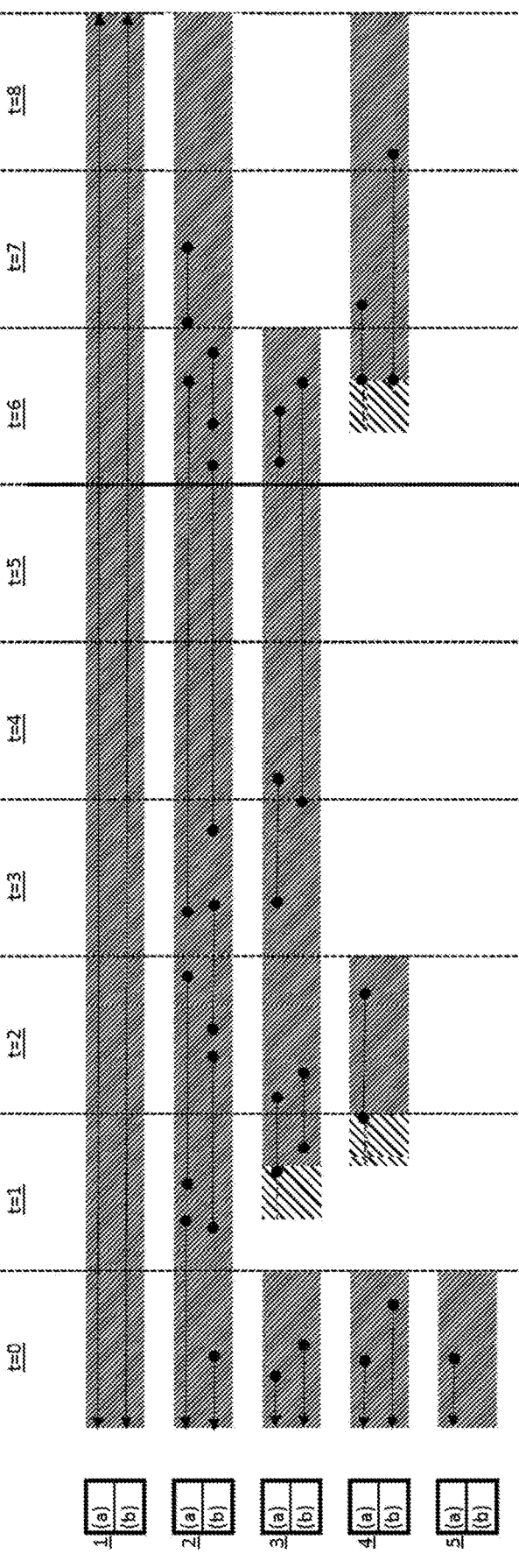
FIG. 2 shows a second arrangement of tasks running on cloud resources.

FIG. 2 shows a similar arrangement of tasks running on cloud resources, but being handled differently by estimating the number of tasks expected to be added to the workload with the equation $$F_t = \text{Integer}\{(1-\alpha)^{n-1}(F_{t-n} + a(A_{t-n} - F_{t-n}))\}$$

The starting value of F0 is taken to be zero. Therefore, calculating F1 we need the value of A0. As no new tasks were added during time period t=0, A0=0, and so F1=0. Accordingly, all three cloud compute resources 3-5 are still terminated at the end of time period t=0.

Calculating F2 we need the value of A1. As five new tasks were added during time period t=1, then A1=5, and so F2=2. As each cloud compute resource can handle two tasks in parallel, that equates to one cloud compute resource being maintained and not terminated. However, as no cloud compute resources are idle at the end of t=1, there is no change to the termination schedule of the cloud compute resources.

Calculating F3 we need the value of A2. As only one new task was added during time period t=2, then A2=1, and so F3=1. As each cloud compute resource can handle two tasks in parallel, that is rounded up to one, and so one of the cloud compute resources will not be terminated at the end of t=2, in this case the third cloud compute resource 3.

As can be seen, the task initiated in time period t=3 can be started immediately, rather than waiting for the third cloud compute resource to spin up.

Calculating F4 we need the value of A3. As four new tasks were added during time period t=3, then A3=3, and so F4=2. As each cloud compute resource can handle two tasks in parallel, that equates to one cloud compute resource being maintained and not terminated. However, as no cloud compute resources are idle at the end of t=3, there is no change to the termination schedule of the cloud compute resources.

Calculating F5 we need the value of A3 again, as no new tasks were added during time period t=4, and so F5=1. Although each cloud compute resource can handle two tasks in parallel, that still equates to one cloud compute resource being maintained and not terminated. However, as no cloud compute resources are idle at the end of t=4, there is no change to the termination schedule of the cloud compute resources.

Calculating F6 we need the value of A3 again, as no new tasks were added during time period t=5, and so F6=0. However, as no cloud compute resources are idle at the end of t-5, there is no change to the termination schedule of the cloud compute resources.

Calculating F7 we need the value of A6. As four new tasks were added during time period t=6, then A6=4, and so F7=2. As each cloud compute resource can handle two tasks in parallel, that equates to one cloud compute resource being maintained and not terminated, and so one of the cloud compute resources will not be terminated at the end of t=6, in this case the second cloud compute resource 2.

Calculating F8 we need the value of A7. As only one new task was added during time period t=7, then A7=1, and so F8=1. Although each cloud compute resource can handle two tasks in parallel, that still equates to one cloud compute resource being maintained and not terminated, and so one of the cloud compute resources will not be terminated at the end of t=6, in this case the second cloud compute resource 2.

The invention claimed is:

1. A controller having a processor, configured to smooth termination of cloud resources, the processor configured to:
   determine a number of tasks ($A_{t-n}$) that were added to a workload during a first time interval (t-n);
   identify a first quantity of cloud resources unused by the end of the first time interval (t-n);
   estimate a second quantity, being a subset of the first quantity, of cloud resources to be required in a second time interval (t); and
   terminate a third quantity of unused cloud resources in the second time interval (t), the third quantity of unused cloud resources equal to the first quantity of cloud resources less the second quantity of cloud resources;
   wherein the second quantity of cloud resources to be required in the second time interval (t) is estimated from a number of tasks expected to be added to a workload ($F_t$) during the second time interval (t), the number of tasks expected to be added to the workload ($F_t$) during the second time interval (t) being estimated from the equation $$F_t = (1-\alpha)^{n-1}(F_{t-n} + \alpha(A_{t-n} - F_{t-n}))$$

where:
$F_{t-n}$ is a number of tasks that were expected to be added to the workload during the first time interval (t-n);
n is the number of time intervals from the first time interval (t-n) to the second time interval (t); and
α is a smoothing factor having a value between zero and one.

2. The controller of claim 1, wherein each time interval is the same length as each other time interval.

3. The controller of claim 1, wherein the number of tasks expected to be added to the workload during the second time interval (t) is the integer part of $F_t$ from the equation $$F_t = (1-\alpha)^{n-1}(F_{t-n} + \alpha(A_{t-n} - F_{t-n}))$$

4. The controller of claim 1, wherein a number of tasks that were expected to be added to the workload during an initial time interval, before which no previous estimations were made, may be zero.

5. The controller of claim 1, wherein a has a value of approximately 0.5.

6. The controller of claim 1, wherein the controller is further configured to:
   determine whether a further number of tasks has been added to the workload since the first time interval;
   in response to determining that no further tasks have been added to the workload since the first time interval, estimate the second quantity of cloud resources to be required in the second time interval as recited in claim 1; and
   in response to determining that a second number ($A_{t-m}$) of tasks has been added to the workload since the first time interval (t):
   identify a fourth quantity of cloud resources unused by the end of an intermediate time interval (t-m), the intermediate time interval (t-m) being the time interval in which the second number of tasks ($A_{t-m}$) was added to the workload; and
   estimate the second quantity of cloud resources to be required in the second tie interval from the number of tasks expected to be added to a workload ($F_t$) during the second time interval (t), the number of tasks expected to be added to the workload ($F_t$) during the second time interval (t) being estimated from the equation $$F_t = (1-\alpha)^{m-1}(F_{t-m} + \alpha(A_{t-m} - F_{t-m}))$$

where:
$F_{t-m}$ is a number of tasks that were expected to be added to the workload during the intermediate time interval (t-m);
m is the number of time intervals from the intermediate time interval (t-m) to the second time interval (t).

7. A method of smoothing termination of cloud resources, the method comprising the steps of:
   determining a number of tasks ($A_{t-n}$) that were added to a workload during a first time interval (t-n);
   identifying a first quantity of cloud resources unused by the end of the first time interval (t-n);
   estimating a second quantity, being a subset of the first quantity, of cloud resources to be required in a second time interval (t); and
   terminating a third quantity of unused cloud resources in the second time interval (t), the third quantity of unused cloud resources equal to the first quantity of cloud resources less the second quantity of cloud resources;
   wherein estimating the second quantity of cloud resources to be required in the second time interval (t) comprises estimating from a number of tasks expected to be added to a workload ($F_t$) during the second time interval (t), the number of tasks expected to be added to the workload ($F_t$) during the second time interval (t) being estimated from the equation $$F_t = (1-\alpha)^{n-1}(F_{t-n} + \alpha(A_{t-n} - F_{t-n}))$$

where:
$F_{t-n}$ is a number of tasks that were expected to be added to the workload during the first time interval (t-n);
n is the number of time intervals from the first time interval (t-n) to the second time interval (t); and
α is a smoothing factor having a value between zero and one.

8. A non-transitory computer-readable medium storing instructions for carrying out the method of claim 7.

\* \* \* \* \*